United States Patent [19]

Sugiyama

[11] Patent Number: 4,626,930

[45] Date of Patent: Dec. 2, 1986

[54] ROTARY RECORDING MEDIUM HAVING DIFFERENT VIDEO SIGNALS RECORDED ON MUTUALLY ADJACENT TRACKS AND REPRODUCING APPARATUS THEREFOR

[75] Inventor: Hiroyuki Sugiyama, Isehara, Japan

[73] Assignee: Victor Company of Japan, Ltd., Yokohama, Japan

[21] Appl. No.: 712,908

[22] Filed: Mar. 15, 1985

Related U.S. Application Data

[63] Continuation of Ser. No. 520,138, Aug. 4, 1983, abandoned, which is a division of Ser. No. 420,856, Sep. 21, 1982, abandoned.

[30] Foreign Application Priority Data

Sept. 26, 1981 [JP] Japan ............................. 56-152352

[51] Int. Cl.$^4$ ..................... H04N 5/76; H04N 5/78; G11B 7/00
[52] U.S. Cl. ................... 358/342; 36 G/44; 360/10.1
[58] Field of Search ............................ 358/310–312, 358/335, 342, 343; 360/10.1, 14.1–14.3, 19.1, 35.1; 369/43, 47

[56] References Cited

U.S. PATENT DOCUMENTS

| 2,968,692 | 1/1961 | Ginsburg et al. | |
|---|---|---|---|
| 3,878,560 | 4/1975 | Ramage | 360/19.1 X |
| 4,331,976 | 5/1982 | Kinjo et al. | 369/43 |
| 4,340,907 | 7/1982 | Hirata et al. | 369/47 X |
| 4,347,527 | 8/1982 | Lainez et al. | 358/342 |
| 4,361,849 | 11/1982 | Bolger | 360/10.1 X |
| 4,375,091 | 2/1983 | Dakin et al. | 358/342 X |
| 4,402,018 | 8/1983 | Wada et al. | 358/342 |
| 4,428,003 | 1/1984 | Sugiyama et al. | 358/342 |
| 4,429,335 | 1/1984 | Sugiyama et al. | 358/342 |
| 4,439,791 | 3/1984 | Hirata | 358/342 |
| 4,449,198 | 5/1984 | Kroon et al. | 364/900 |
| 4,475,132 | 10/1984 | Rodesch | 358/342 |
| 4,490,752 | 12/1984 | Machida et al. | 358/907 X |

FOREIGN PATENT DOCUMENTS

| 0024858 | 3/1981 | European Pat. Off. | 358/343 |
|---|---|---|---|
| 0073604 | 6/1979 | Japan | 358/342 |
| 1198543 | 7/1970 | United Kingdom . | |
| 2064260 | 6/1981 | United Kingdom . | |
| 2071392 | 9/1981 | United Kingdom | 360/10 |

*Primary Examiner*—Aristotelis M. Psitos
*Attorney, Agent, or Firm*—Louis Bernat

[57] ABSTRACT

A rotary recording medium is recorded with video signals on a spiral track thereon, and the video signals are related to different programs with respect to every one track turn. A reproducing apparatus comprises a reproducing element for scanning over the spiral track on the rotary recording medium, and a circuit for shifting the reproducing element to an adjacent track turn at a changeover position of the recorded video signals related to the different programs on each track turn so that the video signal related to the same program is continuously reproduced.

6 Claims, 8 Drawing Figures

ROTARY RECORDING MEDIUM HAVING DIFFERENT VIDEO SIGNALS RECORDED ON MUTUALLY ADJACENT TRACKS AND REPRODUCING APPARATUS THEREFOR

This is a continuation of U.S. application Ser. No. 520,138, filed Aug. 4, 1983, and now abandoned, and entitiled "Rotary Recording Medium Having Different Video Signals Recorded on Mutually Adjacent Tracks and Reproducing Apparatus Therefor", which is a divisional application of U.S. patent application Ser. No. 420,856, filed Sept. 21, 1982, now abanonded.

BACKGROUND OF THE INVENTION

The present invention generally relates to rotary recording mediums and reproducing apparatuses therefor, and more particularly to a rotary recording medium which is recorded with information signals related to different programs on different track turns on one recording surface thereof, and a reproducing apparatus for reproducing an information signal related to one selected and continuous program from such a rotary recording medium.

A new information signal recording and/or reproducing system has been proposed in U.S. Pat. Nos. 4,315,283 and 4,322,836, of which the assignee is the same as that of the present application. According to this proposed system, the recording system forms pits in accordance with an information signal being recorded along a spiral track on a flat rotary recording medium (hereinafter simply referred to as a disc), without forming a groove therein. In the reproducing system, a reproducing stylus traces over along this track to reproduce the recorded information signal in response to variations in electrostatic capacitance.

In this system, since no guide grooves for guiding the reproducing stylus are provided on the disc, it becomes necessary to record pilot or reference signals on or in the vicinity of a track of a program information signal, on the disc. Upon reproduction, the reference signals are reproduced together with the program information signal. Tracking control is carried out so that the reproducing stylus accurately traces along the track in response to the reproduced reference signals.

By use of this previously proposed system, there is no possibility whatsoever of the reproducing stylus or the disc being damaged since the recording track has no groove. The reproducing stylus can trace the same portion of the track repeatedly many times, whereby a special reproduction such as still picture reproduction, slow-motion reproduction, or quick-motion reproduction becomes possible in a case where the recorded information signal is a video signal.

In order to carry out the above special reproduction, a kick pulse is produced by a special reproduction mode control circuit, and this kick pulse is applied to a tracking control coil in a signal pickup reproducing device, to shift the reproducing stylus to an adjacent track. Because the track is formed in a spiral manner, upon still picture reproduction, for example, the reproducing stylus is shifted to an adjacent track in the outer peripheral direction of the disc, once for every revolution of the disc. During slow-motion reproduction, the reproducing stylus is shifted to an adjacent track in the outer peripheral direction of the disc, once for every predetermined number of revolutions over one inclusive of the disc. Further, upon quick-motion reproduction, the reproducing stylus is shifted to a track in the inner peripheral direction of the disc.

Accordingly, the above conventional special reproduction was performed by carrying out still picture reproduction, slow-motion reproduction, and quick-motion reproduction with respect to a part of a program continuously recorded on the tracks formed on the disc.

However, there is now a demand for recording and reproducing various information programs on the disc. Hence, it is highly desirable to realize a new special reproducing system for obtaining a special reproduction picture such as a reproduction picture obtained by composing different recorded information and a reproduction picture obtained by selecting information from among a plurality of recorded information.

Hence, the present inventor has endeavored at realizing a new disc which satisfies the above demands. That is, he has endeavored to realize a disc recorded with a kick signal at predetermined positions for shifting the reproducing element to an adjacent track, so as to suitably select different plurality of program video information recorded on each track according to the kick signal obtained during reproduction to obtain a reproduced picture. However, in this disc, the kick signal must be recorded at predetermined positions on the disc. Thus, the circuit construction of the recording system became complex. In addition, a circuit for discriminating and reproducing the recorded kick signal became necessary in the reproducing system. Accordingly, there was a disadvantage in that the circuit construction became complex in the recording and/or reproducing apparatus.

Further, it was found that if the audio signal is recorded in a normal manner, there is a problem in that discontinuity is introduced in the reproduced audio information when the program of the above program video information is selectively reproduced. That is, if the reproducing element is shifted within a vertical blanking period of the video signal recorded on the track, no inconvenient phenomenons appear in the reproduced picture obtained by the reproduced video signal due to the above shift. However, discontinuity is introduced in the audio signal.

SUMMARY OF THE INVENTION

Accordingly, it is a general object of the present invention to provide a novel and useful rotary recording medium and reproducing apparatus therefor, in which the above described disadvantages have been overcome.

Another and more specific object of the present invention is to provide a rotary recording medium which is recorded with information signals related to different programs on different track turns on one recording surface thereof, and a reproducing apparatus for reproducing an information signal related to one selected and continuous program from such a rotary recording medium. Accordingly to the rotary recording medium of the present invention, no kick signal is recorded for shifting a reproducing element over the track turns so as to reproduce the selected program information signal. According to the reproducing apparatus of the present invention, there is no circuit provided for discriminating and reproducing the kick signal.

Still another object of the present invention is to provide a rotary recording medium which is recorded as described above and on which an audio signal is recorded so that the reproduced sound does not become discontinuous when the reproducing element is shifted over the track turns so as to reproduce the selected program information signal upon reproduction, and a reproducing apparatus for reproducing such a rotary recording medium.

Other objects and further features of the present invention will be apparent from the following detailed description when read in conjunction with the accompanying drawings.

DETAILED DESCRIPTION

Figure 1:
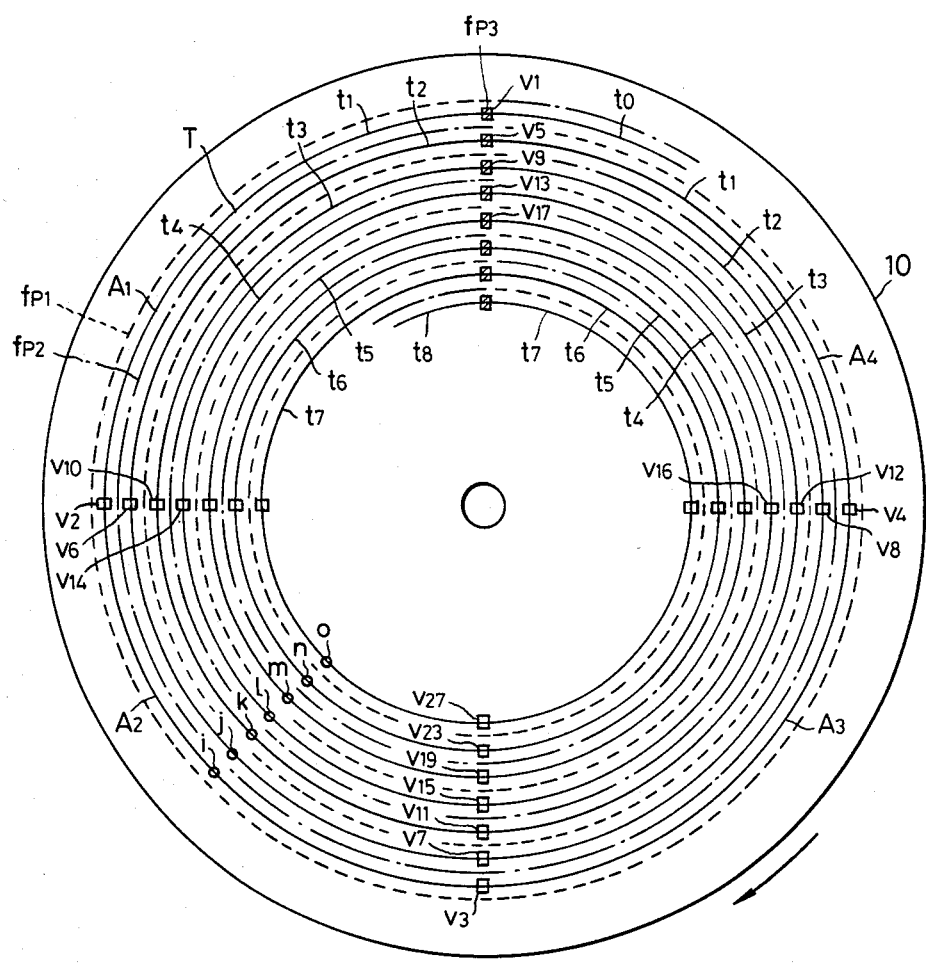
FIG. 1 shows a first embodiment of a track pattern on a disc according to the present invention.

First description will be given with respect to a first embodiment of a disc according to the present invention, by referring to FIG.1.

A disc 10 is recorded with a video signal along a spiral track T for one revolution of the disc. Tracks of the first reference signal fp1 are shown by dotted lines, while the tracks of the second reference signal fp2 are shown by one-dot chain lines. The positions of the vertical synchronizing signals of respective fields of the video signal are designated by reference characters V1, V2, V3, ..., and the successive track parts corresponding to one revolution of the disc of a single spiral track T are designated by track turns t1, t2, t3, ... Furthermore, a third reference signal fp3 is recorded at the starting end positions V1, V5, V9, ... of each of the track turns t1, t2, t3, ..., that is, at positions where the reference signals fp1 and fp2 switch over.

A video signal of a first program is recorded in an interval V1-V3, that is, from the position V1 reaching the position V3 on the track t1. A video signal of a second program having a content different from the first program, is recorded in an interval V3-V7. Similarly, the first program is recorded in intervals V7-V11, V15-V19, V23-V27, ..., and the second program is recorded in the intervals V11-V15, V19-V23, ... Accordingly, the first program video signal is reproduced in the order of the intervals V1-V3, V7-V11, V15-V19, ... and becomes continuous. Similarly, the second program video signal is reproduced in the order of the intervals V3-V7, V11-V15, V19-V23, ... and becomes continuous.

With respect to the audio signals, the audio signals are recorded as follows. First, the first channel audio signal is recorded in the following manner. The first channel audio signal having a content corresponding to the first program video signal in the intervals V1-V3 and V7-k, is recorded in an interval V1-j including positions i and V3-V6 and extending to a position j which is 1.5 fields beyond the position V5. The first channel audio signal having a content corresponding to the first program video signal in intervals i-V3 and V7-k, that is, the same audio signal as that in an interval i-j, is recorded in an interval j-k. Accordingly, the content of the first channel audio signal is discontinuous at the position j. An audio signal corresponding to the video signal content in intervals k-V11 and V15-m and is continuous with the audio signal in the interval j-k at the position k, is in recorded in an interval k-1. An audio signal which is the same as that recorded in the interval k-1, is recorded in an interval 1-m, and the content is discontinuous at the position 1. In addition, an audio signal which corresponds with the video signal content in intervals m-V19 and V23-0, and is continuous with the audio signal recorded in the interval 1-m at the position m, is recorded in an interval m-n. An audio signal which is the same as that recorded in the interval m-n, is recorded in an interval n-o, and the content is discontinuous at the position n.

The second channel audio signal is recorded in the following manner. The second channel audio signal corresponding to the content of the second program video signal is recorded in the interval V3-j. An audio signal which is the same as the audio signal corresponding to the video signal in the intervals j-V7 and V11-1, is recorded in an interval j-k. At the position j, the content of the audio signal recorded in the interval V3-j and the content of the audio signal recorded in the interval j-V7 are continuous. The audio signal recorded in the interval k-1 is the same as that recorded in the interval j-k, and the content is discontinuous at the position k. The audio signal recorded in the interval 1-m is the same as the audio signal which corresponds with the video signal content in intervals 1-V15 and V19-n, and the content is continuous at the position 1. The audio signal recorded in the interval m-n is the same as that recorded in the interval 1-m, and the content is discontinuous at the position m.

Because the audio signal is recorded as described heretofore, for example, the audio signal which is the same as the first channel audio signal recorded subsequent to the position V7 (V15, V23, ... ) is recorded subsequent to the position V3 (V11, V19, ... ) on the track turn t1 (t3, t5, ... ), in continuous with the first channel audio signal recorded prior to the position V3 (V11, V19, ... ). Moreover, the audio signal which is the same as the first channel audio signal recorded prior to the position V3 (V11, V19, ... ) is recorded in a predetermined portion prior to the position V7 (V15, V23, on the track turn t2 (t4, t6, ... ), continuing to the audio signal recorded subsequent to the position V7 (V15, V23, ... ). When the first program video signal is reproduced by scanning over the track turn t1 (t3, t5, ...) and a reproducing stylus of the reproducing apparatus is kicked at the position V3 (V11, V19, ... ) to be shifted to the adjacent track turn t2 (t4, t6, ... ) so as to continuously reproduce the first program video signal, there will be no discontinuity in the content of the audio signal reproduced before and after the reproducing stylus is shifted. Thus, satisfactory reproduction of the audio signal is ensured. The second program video signal and the second channel audio signal are reproduced similarly, and there is no unwanted discontinuity in the content of the reproduced signal.

Figure 2:
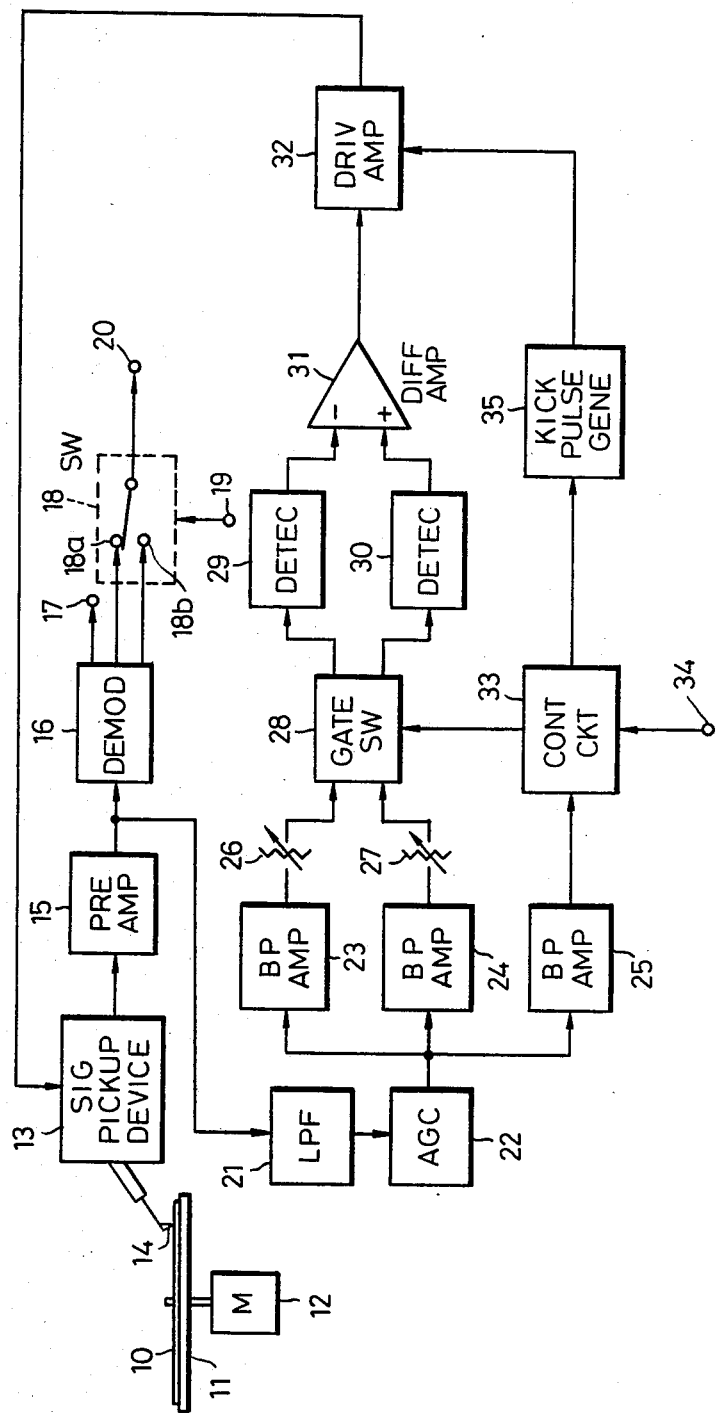
FIG. 2 is a systematic block diagram showing an embodiment of a reproducing apparatus for reproducing the disc shown in FIG.1.

An embodiment of a reproducing apparatus for reproducing the above disc 10, is shown in FIG.2. The disc 30 is placed onto a turntable 11 and rotated by a motor 12 at a rotational speed of 900 rpm, for example. A signal pickup device 13, used as a reproducing transducer, has a reproducing stylus 14, and moves continuously and linearly in a direction from the outer peripheral part to the inner peripheral part of the disc at a speed equal to the distance of one track pitch per revolution of the turntable 11, during a forward normal reproduction mode. Accordingly, the reproducing stylus 14 of the signal pickup device 13 moves radially across the rotating disc 10 and relatively scans over the spiral track on the disc 10.

A reproduced signal picked up from the disc 10 as minute variations in the electrostatic capacitance by the reproducing stylus 14 of the signal pickup device 13, is supplied to a preamplifier 15 having a resonant circuit. The resonance frequency of the resonant circuit varies in response to this variation in the electrostatic capacitance, and is formed into a signal of a desired level. The resulting output of the preamplifier 15 is demodulated into the original video signal by a demodulator 16 and is obtained through an output terminal 17.

The first and second channel audio signals obtained from the demodulator 16, are respectively supplied to contacts 18a and 18b of a switch 18. A movable contact of the switch 18 is switched and connected to one of the contacts, according to a mode specifying signal applied to an input terminal 19. That is, if the signal from the input terminal 19 is a first mode specifying signal, the movable contact of the switch 18 is connected to the contact 18a. On the other hand, if the signal from the input terminal 19 is a second mode specifying signal, the movable contact of the switch 18 is connected to the contact 18b. The first or the second channel audio signal which is selectively passed through the switch 18, is obtained from an output terminal 20.

On the other hand, the output signal of the preamplifier 15 is supplied to a lowpass filter 21 wherein the reference signals fp1, fp2, and fp3 are separated. The output reference signals pass through an automatic gain control circuit 22, and are respectively supplied to amplifiers 23, 24, and 25. Here, each of the amplifiers 23, 24, and 25 is a kind of a bandpass amplifier respectively designed to have steep passing frequency characteristics at only the respective frequency fp1, fp2, and fp3. As a result, the signals having frequencies fp1 and fp2 are respectively separated and obtained from the amplifiers 23 and 24. These signals respectively pass through level adjustors 26 and 27, wherein the levels of the signals are adjusted. The resulting signals are then supplied to a gate switching circuit 28. The reference signal fp3 separated and amplified at this bandpass amplifier 25, is supplied to a control circuit 33.

A mode specifying signal identical to that applied to the input terminal 19, is applied to a control circuit 33 from an input terminal 34. If the program video signal which is to be selected is the first program signal, the first mode specifying signal is applied to the input terminal 65. On the other hand, if the program video signal which is to be selected is the second program signal, the second mode specifying signal is applied to the input terminal 34.

The gate switching circuit 28 performs switching of the reference signals fp1 and fp2 every one revolution period of the disc 10 upon normal reproduction, in response to the switching signal generated by the control circuit 33 which is applied thereto. Hence, due to the switching signal which reverses polarity every 1/15 seconds, the signals fp1 and fp2 are always alternately supplied to detecting circuits 29 and 30 from the gate switching circuit 28.

The detecting circuits 29 and 30 detect the envelopes of their respective input reference signals, and convert the input reference signals into DC voltages. These DC voltages are then supplied to a differential amplifier 31. The differential amplifier 31 compares the output signals of the two detecting circuits 29 and 30 which vary in response to the reproduced levels of the reference signals fp1 and fp2, and generates an output tracking error signal which indicates the direction of the tracking error and the error quantity. This tracking error signal is amplified to a specific level by a driving amplifier 32.

The output signal of the driving amplifier 32 is applied to tracking coils of the signal pickup device 13 as a control signal, to control these tracking coils. Hence, tracking control is carried out with respect to the reproducing stylus 14 so that the above tracking error signal becomes zero, that is, so that the reproducing stylus 14 accurately scans over the track T on the disc 10.

Figure 3:
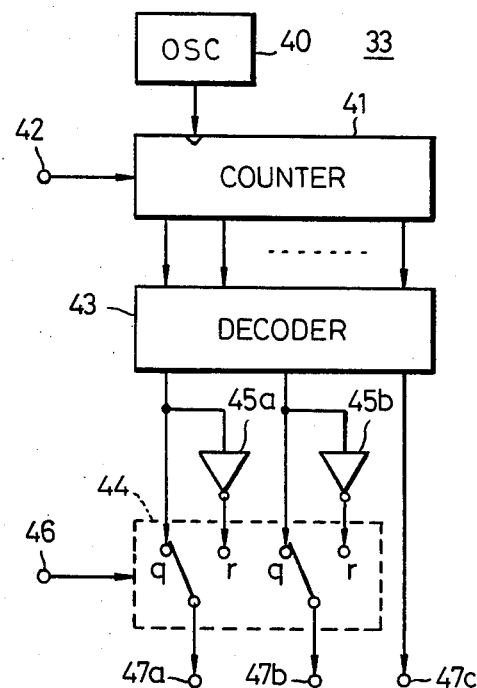
FIG. 3 is a systematic block diagram showing an embodiment of a concrete construction of a control circuit in the block system shown in FIG.2.
Figure 4:
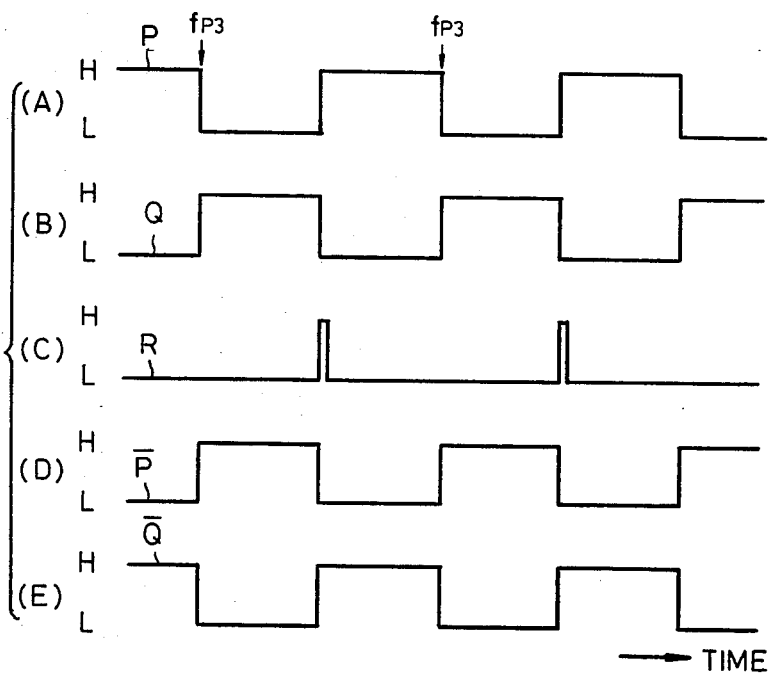
FIGS. 4(A) through 4(E) respectively show output signal waveforms of the control circuit shown in FIG.3.

For example, the control circuit 33 has a circuit construction shown in FIG.3. An oscillation output of an oscillator 40 is applied to a counter 41 as a clock pulse. The counter 41 is also applied with the third reference signal fp3 from the amplifier 25 as a reset signal, through a terminal 42. An output of the counter 41 is supplied to a decoder 43. Signals P and Q respectively shown in FIGS.4(A) and 4(B) which are obtained from the decoder 43, are applied to a contact q of a switch 44. Inverted signals P and Q respectively shown in FIGS. 4(D) and 4(E) which are obtained by inverting the signals P and Q at inverters 45a and 45b, are supplied to a contact r of the switch 44. A movable contact of the switch 44 is switched over and connected to the contact q or r according to the first or the second mode specified by the mode specifying signal from the terminal 46. The signals P and Q are obtained at output terminals 47a and 47b during the first mode, and the signals P and Q are obtained at the output terminals 47a and 47b during the second mode. The above signals obtained at the output terminals 47a and 47b are respectively supplied to the gate switching circuit as gate switching signals. In addition, a signal R shown in FIG. 4(C) is obtained from the decoder 43 and produced through an output terminal 47c. This signal R is supplied to the kick pulse generator 35 which generates a kick pulse for shifting the reproducing stylus 14 by one track pitch.

When reproducing the first program video signal and the first channel audio signal corresponding to this first program video signal, the first mode specifying signal is applied to the input terminals 19 and 34. In this state, the reproducing stylus 14 reproduces the recorded information in the interval V1–V3, and is kicked once at the position V3. Thereafter, the reproducing stylus 14 scans over the interval V7–V11 and is kicked once at the position V11. The reproducing stylus 14 then scans over the interval V15–V19 and is kicked once at the position V19. The scanning by the reproducing stylus 14 is continued similarly thereafter. As a result, the intervals V1–V3, V7–V11, V15–V19, . . . are continuously reproduced. The first program video signal is obtained from the output terminal 17, and the first channel audio signal corresponding to the above first program video signal is obtained from the output terminal 20. The reproducing stylus 14 is kicked once and shifted at the positions V3, V11, V19, . . . However, as described above, the first channel audio signal recorded in the interval i–j is the same as the audio signal recorded in the interval j–k. Similarly, the audio signals recorded in the intervals k–l and l–m are the same, and the audio signals recorded in the intervals m–n and n–o are the same. Accordingly, discontinuity is not introduced in the reproduced audio signal content when the reproducing stylus 14 is shifted.

On the other hand, when reproducing the second program video signal and the second channel audio signal corresponding to the second program video signal, the second mode specifying signal is applied to the input terminals 19 and 34. The reproducing stylus 14 reproduces the recorded information in the interval V3–V7, and is kicked once at the position V7. Thereafter, the reproducing stylus 14 scans over the interval V11–V15 and is kicked once at the position V15. The reproducing stylus 14 then scans over the interval V19–V23 and is kicked once at the position V23. The scanning by the reproducing stylus 14 is continued similarly thereafter. As a result, the intervals V3–V7, V11–V15, V19–V23, . . . are continuously reproduced. The second program video signal is obtained from the output terminal 17, and the second channel audio signal corresponding to the above second program video signal is obtained from the output terminal 20. The reproducing stylus 14 is kicked once and shifted at the positions V7, V15, V23, . . . However, as described above, the second channel audio signal recorded in the interval j–k is the same as the audio signal recorded in the interval k–l. Similarly, the audio signals recorded in the intervals l–m and m–n are the same, and the audio signals recorded in the interval n–o and the continuing interval of one revolution of the disc 10 are the same. Accordingly, discontinuity is not introduced in the reproduced audio signal content when the reproducing stylus 14 is shifted.

Further, the present invention is not limited to these embodiments, but various variations and modifications may be made without departing from the scope of the present invention.

What is claimed is:

1. A rotary recording medium which is playable on a reproducing apparatus having a reproducing element for reproducing signal from the rotary recording medium, said rotary recording medium comprising:

a spiral track (T) made up of a plurality of consecutive track turns;

first and second video signals alternately recorded on said plurality of track turns so that two mutually adjacent track turns have different video signals recorded thereon, said first video signal relating to a first program, said second video signal relating to a second program which is different from said first program; and first and second audio signals recorded on said plurality of track turns, said first audio signal being related to said first program, said second audio signal being related to said second program;

said first program being reproduced responsive to said reproducing element scanning over (2n+1)-th track turns with a kick at each of kicking position (V3, V11, V19, . . . ) where said reproducing element is kicked between (2n+1)-th and (2n+3)-th track turns, where n+0, 1,2, . . . ;

said second program being reproduced responsive to said reproducing element scanning over (2n+2)-th track turns with a kick at each of a plurality of kicking positions (V7, V15, V23, . . . ) where said reproducing element is kicked between (2n+2)-th and (2n+4)-th track turns;

said kicking positions (V3, V7, V11, . . . ) being arranged along a radial line extending across at least a part of said rotary recording medium;

a first continuous track portion including a kicking position which is constituted by portions of the (2n+1)-th and (2n+2)-th track turns which are consecutive track turns;

a second continuous track portion including a kicking position which is constituted by portions of the (2n+2)-th and (2n+3)-th track turns, which are consecutive track turns;

a third continuous track portion including a kicking position which is constituted by portions of the (2n+3)-th and (2n+4)-th track turns, which are consecutive track turns;

said first and second continuous track portions containing said first audio signal having identical audio information so that a continuity of audio information related to said first program is maintained as said reproducing element is being kicked between said first and second continuous track portions;

said second and third continuous track portions containing said second audio signal having identical audio information so that a continuity of audio information related to said second program is maintained as said reproducing elemnt is being kicked between said second and third continuous track portions.

2. The rotary recording medium in claim 1 in which said first audio signal contains audio information corresponding to each of said track turns which have said first video recorded over a first set of track segments, each of said first set of track segments having two consecutive track portion (i–j, j–k, k–l, l–m; . . . ), each portion of the two consecutive track portions amounting to the length of one track turn so that within each of the track segments, each portion of two consecutive track portions containing an identical first audio signal, said first identical audio signal being related to said first program, said first identical audio signal having a first audio discontinuous point located at the junction of the two consecutive track portions of the first set, each of said first audio discontinuous points being arranged along a radial line extending across at least a portion of said rotary recording medium which is different from the radial line along which said kicking positions are arranged, said second audio signal having audio information corresponding to each of said track turns with said second video signal recorded over a second set of track segments each of said second set of track segments having two consecutive track portions (j–k, k–l; l–m, m–n; . . . ), each portion of the two consecutive track portions amounting to the length of one track turn so that within each of the track segments, each portion of two consecutive track portions containing an identical second audio signal, said second identical audio signal being related to said second program, said second identical audio signal having a second audio discontinuous point located at the junction of the two consecutive track portions of the second set, each of said second audio discontinuous points being arranged along a radial line extending across at least a part of said rotary recoridng medium which is different from the radial line along which said kicking positions are arranged.

3. The rotary recording medium in claim 2 in which said first and second audio discontinuous points are arranged along the same radial line across at least a part of said rotary recording medium which is different from the line along which said kicking positions are arranged.

4. The rotary recording medium of claim 1 in which each of said plurality of track turns contains a plurality of video fields, and said rotary recording medium further having first and second reference signals (fp1, fp2)

for tracking control, said reference signals being recorded between adjacent track turns over a segment corresponding to each track turn, said first and second reference signals being recorded alternatively with respect to each track turn, and a third reference signal (fp3) recorded on each track turn at a position which corresponds to a switchover position (V1, V5, V9, ...) where the recording of the reference signals switches over between said first and second reference signals, said switchover position being a position where a vertical synchronizing signal of the video signal is recorded.

5. A rotary recording medium playable on a reproducing apparatus equipped with a reproducing element for reproducing a plurality of video and audio signal which are recorded on said rotary recording medium, said rotary recording medium comprising:

a spiral track (T) made up of a plurality of track turns;

first and second video signals which are unrelated to each other in terms of program segmented respectively for two consecutive frame periods and recorded alternately with respect to each other along the spiral track, each segment of the first and second video signals occupying one full track turn so that each of the first and second video signals is discontinuous every two consecutive frame periods when reproduced by said reproducing element along said spiral track but is continuous in terms of program when reproduced so that said reproducing element shifts to an adjacent track turn after having tracked one of said one full track turns, said shift occurring a junction (V3, V7, V11, ...) where a segment of said first video signal couples to a segment of said second video signal;

a first audio signal which is related to said first video signal in terms of program; and a second audio signal which is related to said second video signal in terms of program, both of said first and second audio signals being segmented to be continuous for four consecutive frame periods mnd recorded juxtaposedly and consecutively occupying first through third track turns (j-k, k-l, l-m) by overlapping each other on the second track turn (k-l), said first track turn starting at a position (j) which is slightly ahead of said junction on the spiral track in terms of tracking direction of said reproducing element, a first identical audio signal segment which is identical to a first portion of said first audio signal recorded on rhe first track turn (j-k), being recorded on the preceding track turn (i-j) so that said first identical audio signal segment and said first portion are juxtaposed;

a second identical audio signal segment which is identical to a second portion of said first audio signal recorded on the second track turn (k-l), being recorded on the third track turn (l-m) so that said second identical audio signal segment and said second portion are juxtaposed;

a third identical audio signal segment which is identical to a third portion of said second audio signal recorded on the first track turn (j-K), being recorded on the second turn (k-l) so that said third identical audio signal segment and said third portion are juxtaposed;

a fourth identical audio signal segment which is identical to a fourth portion of said second audio signal recorded on the thrid track turn (l-m), being recorded on the track turn (m-n) which is subsequent to the third track turn so that said fourth identical audio signal segment and said fourth portion are juxtaposed.

6. The rotary recording medium of claim 5 in which each of said plurality of track turns contains a plurality of recorded video fields, and said rotary recording medium further has first and second reference signal (fp1, fp2) for tracking control recorded between adjacent track turns over a segment corresponding to each track turn, said first and second reference signals being recorded alternately with respect to each track turn, and a third reference signal (fp3) recorded on each track turn at a position which corresponds to a switchover position (V1, V5, V9, ...) where the recording of the reference signals switches over between said first and second reference signals, said switchover position being a position where a vertical synchronizing signal of the video signal is recorded.

* * * * *